June 16, 1925.  1,542,360

N. C. BETHEA

AUTOMOBILE SPRING JACK

Filed July 10, 1924  2 Sheets-Sheet 1

INVENTOR.
N. C. Bethea.
BY
ATTORNEYS.

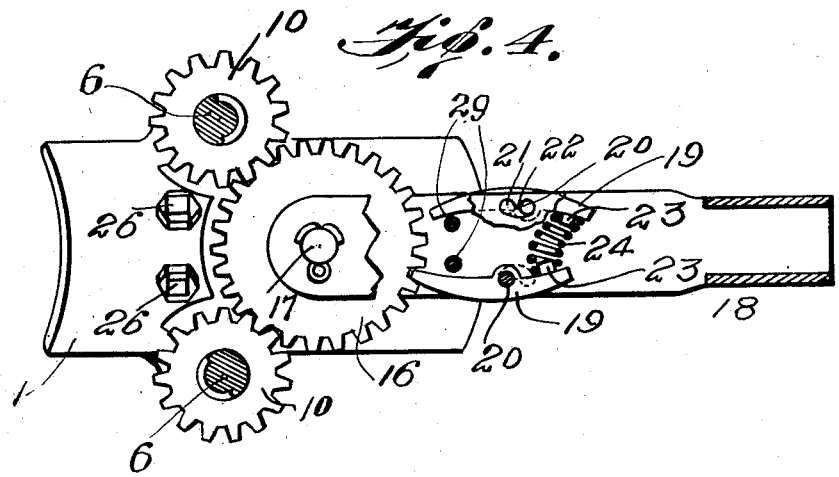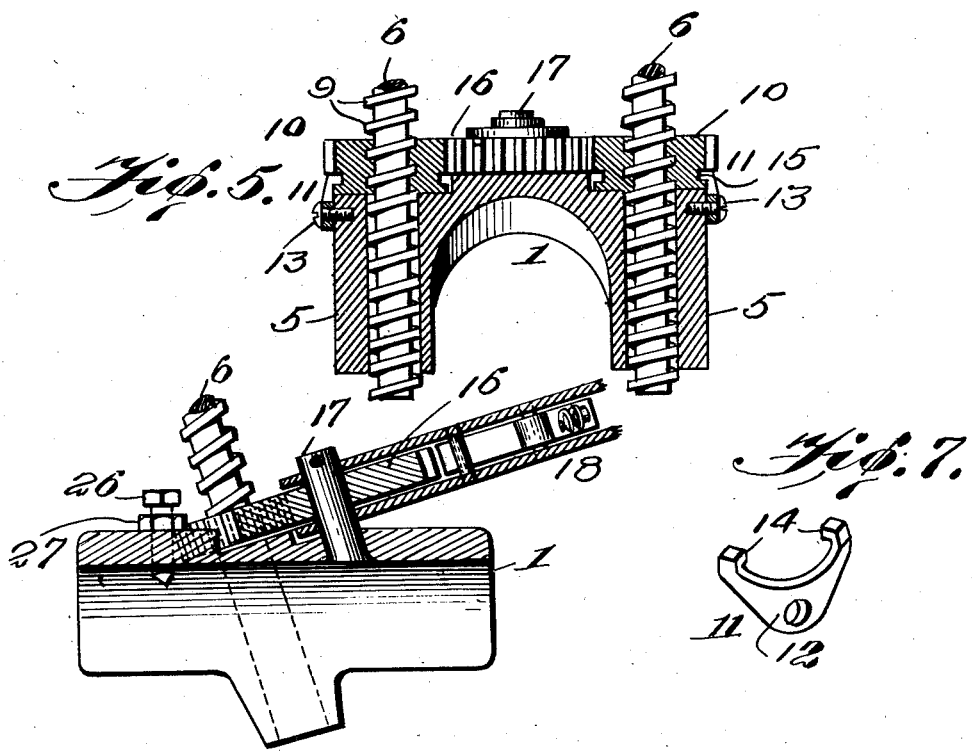

Patented June 16, 1925.

1,542,360

UNITED STATES PATENT OFFICE.

NORMAN C. BETHEA, OF DUNN, NORTH CAROLINA.

AUTOMOBILE-SPRING JACK.

Application filed July 10, 1924. Serial No. 725,246.

*To all whom it may concern:*

Be it known that I, NORMAN C. BETHEA, a citizen of the United States, residing at Dunn, in the county of Harnett and State of North Carolina, have invented certain new and useful Improvements in an Automobile Spring Jack, of which the following is a specification, reference being had therein to the accompanying drawings.

This invention relates to a spring jack, and the object of the invention is the construction of a simple and efficient jack that is adapted to be placed on the front or rear axle of an automobile when it is desired to install shock absorbers, springs and spring accessories.

With this and other objects in view, my invention comprises certain novel combinations, constructions and arrangements of parts as will be hereinafter described, illustrated in the accompanying drawings, and more particularly pointed out in the appended claims.

In the drawings:

Figure 1 is a view, in side elevation, of a jack constructed in accordance with the present invention, showing the same in position on an axle and operating on the right-hand end of a spring, while

Figure 4 is partly a section and partly a top plan view of my spring jack.

Figure 5 is a transverse, sectional view of the spring jack.

Figure 6 is a longitudinal, sectional view of the jack.

Figure 7 is a perspective view of one of the holding devices.

Figure 1:
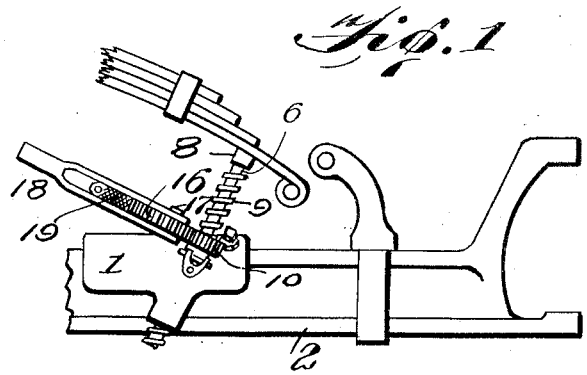
Figure 2:
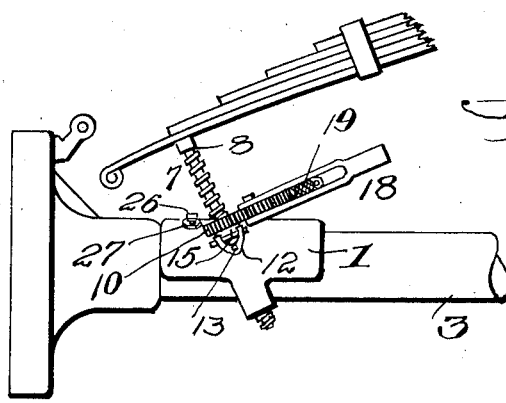
Figure 2 is a similar view showing the jack operating on the left-hand end of a spring.
Figure 3:
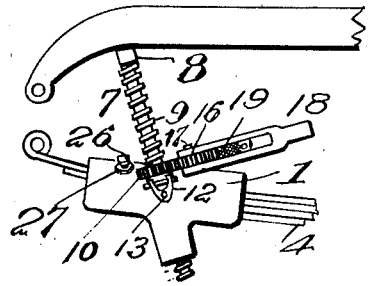
Figure 3 is a view, in side elevation, of my jack, showing the same on a spring for separating the parts thereof.

Referring to the drawings by numerals, 1 designates the body of the jack which is adapted to fit over an axle 2, a shaft 3 or a spring 4. This saddle-like body 1 is provided with inclined guides 5—5 through which guides extend the legs 6 of the frame 7. This frame includes the vertically positioned legs 6 and the horizontal spring engaging portion 8. On the legs 6 are formed worms 9, which worms are threaded through the pinions 10.

The pinions 10 rest upon the top of the body 1 and are held in position by holding devices 11. These holding devices each comprises a body 12 through which screw 13 extends for holding said device 11 in position so that the inwardly-extending lugs 14 are held in the peripheral groove 15, formed in the pinion 10.

A gear 16 is mounted on stub shaft 17, which shaft 17 is secured, at its lower end, in the body 1. This gear 16 meshes with the pinions 10 and when the gear is rotated the pinions are operated for raising and lowering the frame 7.

An operating handle 18 is pivotally mounted on the shaft 17, its lower end being bifurcated to straddle the gear 16. In the bifurcated end of handle 18 are positioned dogs 19. Each dog is provided with a pin 20, which pin works in an elongated slot 21, said slot 21 having an inwardly-extending portion 22, Fig. 4, so that when the pin 20 is placed at the outer end of slot 21, at one side of point 22, the dog 19 will be held from engagement, at its inner end, with the teeth of gear 16, whereas when the dog is pushed inwardly for placing pin 20 at the inner end of slot 21, the inner end of the dog will engage the pinion as shown by one of the dogs in Fig. 4 for holding the pinion against rotary movement in one direction. On the inner faces of the dogs 19 are pins 23, upon which pins 23 are mounted the ends of coil spring 24. This spring tends to hold the dogs in their adjusted position until the operator manually moves the same. Slot pins 25 are placed in the handle, between the inner ends of dogs 19, for preventing the dogs from having too much inwardly-swinging movement at their inner ends.

Adjusting bolts 26 are placed near one end of body 1 and on these bolts are threaded lock nuts 27, so that when these bolts have been adjusted to obtain the desired position for the body on the surface upon which it is mounted, these nuts 27 can be secured down against the body and hold the adjusting bolts in a fixed position.

It is to be understood that the gear locking device constituted by the spring pressed dogs 19, is provided for permitting the operator to "lock" the handle so that one dog will engage the gear 16 when it is desired to raise the frame 7, and then when it is desired to lower the frame this first dog is unlocked, by moving it to its outer position on the handle (as indicated by one of the dogs in Fig. 4) and then the other dog is moved into position for engagement with the gear 16 when it is desired to lower the substantially U-shaped frame 7.

My jack is particularly adapted for operating upon the springs of motor vehicles as one man can operate the same with comparative ease, either for assembling or disassembling the spring, as the case may be.

It is to be understood that the jack slips on the front or rear axle and is easy to attach or detach and will save half time in installing shock absorbers, springs and spring accessories.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In a jack of the class described, the combination of a body provided with inclined guides, a frame having legs positioned in said guides, said legs provided with pinions for raising and lowering the same, and means carried by the body and co-operating with said pinions for actuating said pinions.

2. In a jack of the class described, the combination of a body provided at opposite sides with inclined guides, a frame provided with threaded legs extending into said guides, pinions on said legs and resting against said body, a gear on said body and meshing with said pinions, and an operating handle carried by said body and provided with means for rotating said gear and thereby imparting movement to the pinions and raising and lowering said frame.

3. In a jack of the class described, the combination of a body provided with an axle or shaft-receiving portion and with inclined guides formed on its sides, a stub shaft extending from the top or outer portion of said body, a frame provided with legs positioned in said guides, said legs provided with worms, pinions on the wormed portion of the legs and bearing against said body, a gear on said shaft and meshing with said pinions, an operating handle on said shaft and provided with means for operating said gear for imparting movement to said pinions.

4. In a jack of the class described, the combination of a body adapted to fit upon a shaft or axle, a frame movably mounted on said body, adjusting bolts provided with lock nuts on said body, and means carried by the body for raising and lowering the frame.

5. In a jack of the class described, the combination of a body, a spring engaging frame movably mounted upon said body, an operating handle on said body provided with means for cooperating with the frame for raising and lowering the same, a locking device on said handle for locking said raising and lowering means, said locking device comprising a pair of dogs, means for locking each dog in an adjusted position, and a spring interposed between said dogs.

6. In a jack of the class described, the combination of a body, a frame movably mounted on said body, said frame provided with pinions, a gear on the body and meshing with said pinions, an operating handle carried by the body and provided with a gear locking device cooperating with said gear for locking said frame in an adjusted position, said gear locking device comprising a pair of slidably mounted dogs, said handle provided with slots each having an inwardly-extending portion near its center, each dog provided with a pin extending into a slot and adapted to be positioned at either end of the slot at opposite sides of the inwardly-extending portion, pins on the handle between the inner ends of the dogs, inwardly-extending pins projecting from the inner faces of the dogs, and a spring having its ends mounted on the last-mentioned pins.

7. In a jack of the class described, the combination of a body, pinions mounted on said body, each pinion provided with a peripheral groove, holding devices against the sides of the body, screws extending through the holding devices into said body, each holding device provided with inwardly-extending lugs positioned in the groove of a pinion, a gear meshing with said pinions, a frame threaded through said pinions, and means for operating said gear for raising and lowering the frame upon said body.

In testimony whereof I hereunto affix my signature.

NORMAN C. BETHEA.